United States Patent Office 3,531,099
Patented Sept. 29, 1970

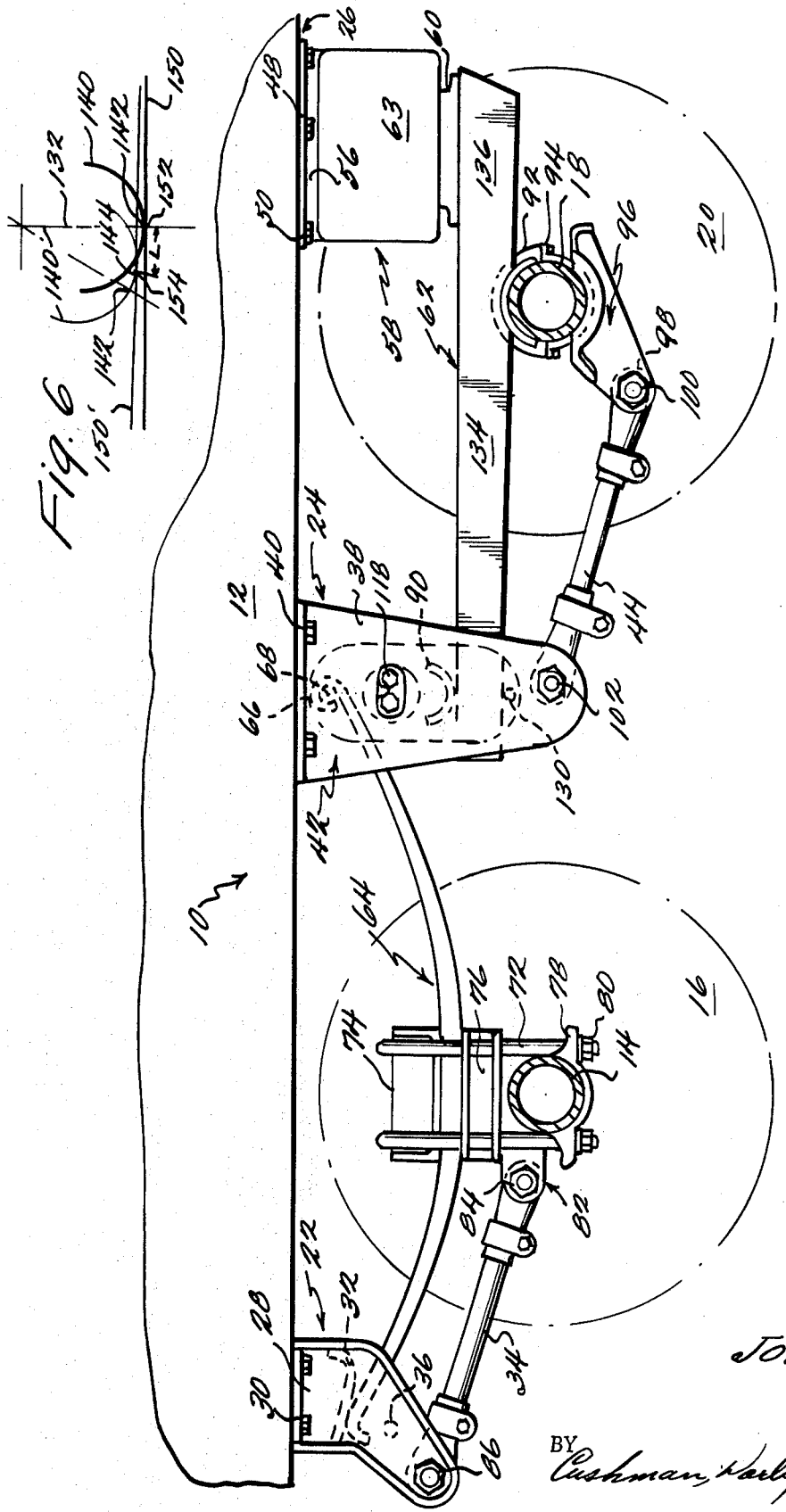

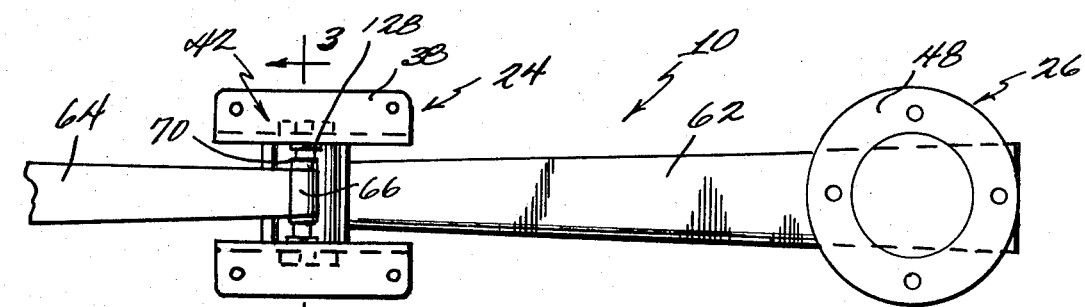
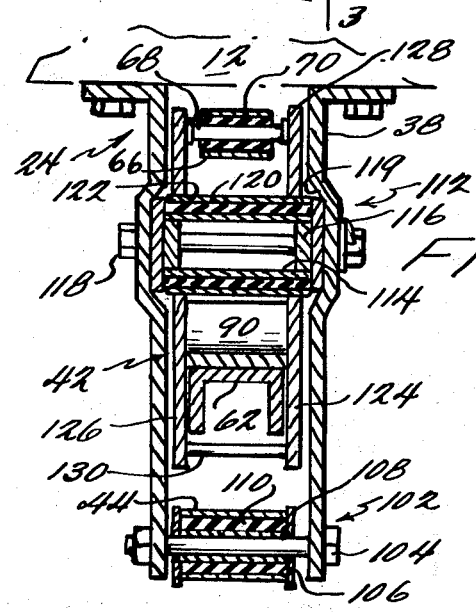

3,531,099
EQUALIZER ASSEMBLY
John B. King, Springfield, Mo., assignor to Hutchens and Son Metal Products, Inc., Springfield, Mo., a corporation of Missouri
Filed Jan. 26, 1968, Ser. No. 701,003
Int. Cl. B60g 11/04
U.S. Cl. 267—56
9 Claims

ABSTRACT OF THE DISCLOSURE

Equalizer brackets are pivotally carried by hanger plates mounted on the frame of a vehicle with the longitudinal center lines of the brackets being substantially vertical. Leaf or air spring assemblies of a first axle are secured to the equalizer brackets at points spaced above the horizontal pivotal axes of the brackets; while lever arms of air spring assemblies associated with a second axle are in contact with the equalizer brackets at points spaced below the pivotal axes with the points of contact between the equalizer brackets and lever arms being altered by pivotal movement of the equalizer brackets about the pivot as axes to change the effective lengths of the lever arms.

BRIEF DESCRIPTION OF THE INVENTION

The present invention relates to an equalizer arrangement for a tandem axle assembly and, more particularly, to an equalizer arrangement adapted to be utilized with conventional leaf spring and air spring assemblies.

It is an object of the present invention to provide simple, inexpensive equalizer assemblies for tandem axle vehicles that automatically shift the load between axles of a vehicle in accordance with the requirements of different situations to distribute the load generally uniformly between the axles thereby enabling the vehicle to carry a maximum load safely.

The invention is carried out by disposing equalizer assemblies, with their longitudinal axis extending substantially vertical, intermediate air spring and/or leaf spring assemblies. The equalizer brackets are pivotally mounted on axes which extend transversely in a horizontal direction with respect to the equalizer brackets. Leaf springs or the beams of air spring assemblies associated with one of the axles are connected to the equalizer brackets on one side of the pivotal axes; while the beams of air spring assemblies of the second axle, which each comprise first and second lever arms, contact the equalizer brackets on the other side of the pivotal axes. The equalization of load distribution between the axles is obtained by the pivotal movements of the equalizer brackets caused by the leaf or air spring assemblies of the one axles which change the effective lengths of the first lever arms of the air spring assemblies of the second axle.

Other features and advantages of the present invention will become more apparent from the following detailed description when taken in conjunction with the accompanying drawings in which:

FIG. 1 is a side elevational view of the frame of a vehicle taken through tandem axles of the vehicle and illustrating the equalizer assembly of the present invention;

FIG. 2 is a plan view of the equalizer assembly taken substantially along lines 2—2 of FIG. 1;

FIG. 3 is a cross-sectional view of the equalizer assembly taken substantially along lines 3—3 of FIG. 2;

FIG. 4 is a perspective view of an equalizer bracket of the present invention;

FIG. 5 is a diagrammatic representation showing the equalizer bracket under various loading situations; and FIG. 6 is a diagrammatic representation illustrating the manner in which the point of contact between the wear plate of the equalizer bracket and the beam of an air spring unit is altered by pivotal movement of the equalizer bracket.

DETAILED DESCRIPTION OF THE INVENTION

Referring now to the drawings, there is shown in FIG. 1 thereof a tandem axle suspension assembly generally indicated at 10 embodying the principles of the present invention. The suspension assembly is shown mounted on a vehicle frame 12 forming a part of a conventional truck body of any suitable construction.

The suspension assembly 10, as shown, is of the tandem axle type providing a front axle 14 of conventional construction having front wheels 16 rotatably mounted on the ends thereof and a rear axle 18 of conventional construction having rear wheels 20 rotatably mounted on the ends thereof. It is to be understood that the wheeled axles may be of any conventional construction including the provision of conventional brake assemblies, not shown, adapted to be actuated from the control cabin of the vehicle.

The suspension assembly 10 includes pairs of front, intermediate and rear hangers, only one hanger of each pair being shown, generally indicated by numerals 22, 24, 26 respectively. As shown, the three hangers constitute three separate subassemblies, each of which is separately secured to the vehicle frame 12 although, it is to be understood that the three hangers can be provided by a single rigid subassembly which is rigidly secured to the frame of the vehicle as a unit.

Each front hanger 22 comprises a pair of transversely spaced L-shaped mounting plates 28 positioned beneath the side frame members of the vehicle frame 12 and rigidly secured thereto by bolt assemblies 30, welding or other suitable fastener means. A metallic wear plate 32 extends between and is welded or otherwise rigidly secured in a fixed position to the upper portions of the depending members of each pair of hanger plates 28 while one end of a torsion bar assembly 34 is secured to the lower portions of the depending members. Spaced below the wear plate 32 on each hanger 22 is a tubular member 36 which extends between and is welded or otherwise rigidly secured to the pairs of plates 28 thereby serving to brace the lower end portions of each pair of hanger plates. In addition to the bracing and bolt assemblies shown, additional cross bracing of conventional construction can be provided if neded.

Each intermediate hanger 24, as shown in FIGS. 1 to 3, also includes a pair of transversely spaced L-shaped mounting plates 38 similar to the mounting plates 28 previously described. Mounting plates 38 are positioned beneath and rigidly secured to the side frame members of the vehicle frame 12 by bolt assemblies 40, welding or other suitable fastener means. Equalizer bracket 42 is pivotally mounted between the midportions of the depending members of the mounting plates 38 as will be more fully explained hereinafter; while torsion bar assembly 44 is secured to the lower portions of the depending members. In addition to the bracing and securing means shown, additional conventional bracing and cross-bracing of the intermediate hanger 24 can be provided if needed.

Each rear hanger means 26 comprises an annular plate 48 positioned beneath the side frame members of the vehicle frame 12 and rigidly secured thereto by bolt assemblies 50, welding or other suitable fastener means. Upper ring members 56 of conventional air spring units 58, only one of which is shown, are bolted, welded or otherwise secured to plates 48; while plates 60 of the units are similarly secured to a pivotal beam 62. The air spring units 58 each comprise a bellows or air bag 63 which is interconnected to a supply of air under pressure by conventional pneumatic lines wherein the required amount of air under pressure is introduced into each air spring unit 58.

The suspension assembly 10 of the present invention also includes a pair of front leaf springs 64, only one of which is shown, mounted with their front ends in sliding abutting relation with the undersides of wear plates 32 and with loops 66 formed on the rear ends of the springs 64 pivotally mounted on pivot pins 68 which are, in turn, retained in the upper portions of equalizer brackets 42. Pivot pins 68, are each provided with a bushing 70 which is interposed between the pin 68 and loop 66 to ensure that a proper fit between the loop 66 and pin 68 is maintained so that limited pivotal movement of the spring relative to the pivot pin 68 and equalizer bracket 42 is permitted during movement of the equalizer bracket as will be more fully explained hereinafter.

The medial portion of each leaf spring 64 is rigidly secured to the forward transversely extending tandem axle 14 by a shackle which comprises U-bolts 72, an U-bolt saddle block 74, a spring seating block 76 and a clamping plate 78 of conventional design. U-bolt saddle block 74 engages the upper surface of leaf spring 64 and is provided with grooves for retaining U-bolts 72 which pass over the saddle block and down through apertures in the spring seating block 76 which rests on the upper surface of axle 14. The U-bolts continue down through the clamping plate 78 which engages the lower surface of axle 14 and the entire assembly is locked in place by nuts 80 which engage the lower surface of the clamping plate 78.

The spring seating block 76 has a pair of integral spaced-apart elements which form a bracket 82 extending toward the front end of the vehicle for mounting the rear end of front torque arm 34. As shown, torque arm 34 is preferably of conventional adjustable construction with its rear end pivotally connected to the bracket 82 as by a pivot bolt and busing assembly 84 and its front end pivotally connected between the lower forward end portions of the hanger plates 28 as by a pivotal bolt and bushing assembly 86.

The pair of beams 62 of the suspension assembly 10 of the present invention are preferably channel-shaped in transverse cross section and are mounted with the front ends in sliding abutting relation with the convex undersides of wear plates 90 of the equalizer brackets 42 and with the rear ends of the beams secured to conventional spring units such as air spring units 58. The medial portion of each beam 62 is pivotally mounted on the rear axle 18 by means of semi-circular clamping elements 92 and 94 so that each beam comprises opposed first and second lever arms 134, 136, respectively, extending outwardly from the medial portion. Element 92 slidably engages the upper surface of axle 18, is integral with the beam, and depends from the lower side of the beam; while element 94 slidably engages the lower surface of axle 18 and is bolted or otherwise suitably secured to the dependent clamping element 92 of the beam so as to pivotally retain the beam 62 in place.

A torque arm mounting bracket 96 is secured to the underside of the rear axle 18 by welding or other suitable means. The bracket has a pair of spaced-apart elements 98 extending toward the front end of the vehicle which receive therebetween the rear end of rear torque arm 44. As shown, the torque arm 44 is preferably of conventional, adjustable construction with its rear end pivotally connected to elements 98 as by a pivoted bolt and bushing assembly 100 and its front end pivotally connected between the lower end portions of hanger plates 38 as by a pivotal bolt and bushing assembly 102. The pivotal bolt and bushing assembly 102, as shown in FIG. 3, comprises a bolt assembly 104 with a metallic sleeve 106 thereon having reinforcing plates 108 joined to the ends thereof. Carried about the sleeves 106 is a resilient sleeve 110 of rubber or the like which carries the forward end of torque arm 44. While only pivotal bolt and bushing assembly 102 is shown in detail, it is to be understood that bolt and bushing assemblies 84, 86 and 100 are of similar construction.

As shown in FIG. 3, each central hanger 24 includes opposed hanger plates 38 with a load equalizer bracket 42 mounted between them. The bracket receives the adjacent ends of the leaf spring assembly 64 and beam 62 as best shown in FIG. 1. Equalizer bracket 42 is resiliently mounted on an equalizer bearing 112 which includes a center sleeve 114 interposed between opposed end plates 116 having apertures therethrough for receiving bolt assemblies 118 that fixedly connect the bearing between recesses 119 in the plates 38. A resilient sleeve 120 of rubber or the like is mounted on the exterior surface of the cylindrical sleeve 114. The sleeve 120, in turn, is slidably received within sleeve 122 of the bracket 42 whereby the equalizer bracket is pivotally secured at its central section to the center sleeve 114 in a snug engagement with the resilient sleeve 120 as best shown in FIG. 3.

Referring now to FIG. 4, which shows a perspective view of the equalizer bracket 42 of the present invention, the equalizer bracket comprises two spaced-apart, parallel elongated plates 124 and 126 having an upper pivot pin 68 with a bushing 70 thereon for receiving the end of a spring; a semi-circular wear plate 90 extending therebetween with a downwardly facing convex surface for engaging the beam 62; and intermediate sleeve 122 passing therethrough which has a horizontal axis located halfway between pin 68 and plate 90 and which is pivotally mounted on the rubber bushing 120 of the attachment assembly. The longitudinal axis of pivot pin 68 extends in a horizontal direction and the pin is retained in a pair of aligned apertures in plates 124 and 126 by means of snap rings 128, cotter pins or other suitable fastener means. In addition, a pin 130 extends between and is welded or otherwise secured to the lower extremities of the vertically extending equalizer bracket to further strengthen the equalizer bracket and to act as a guide means for the beam 62.

OPERATION

The operation of the vertically extending equalizer bracket of suspension assembly 10 is best shown in FIGS. 5 and 6. FIG. 5 illustrates the different positions of equalizer bracket 42 during oscillation of the system as when the suspension assemblies for axles 14 and 18 varies. The left-hand view of FIG. 5 illustrates the position of the equalizer bracket 42 when the distribution of the load on the vehicle is such that the load transmitted to the forward and rear suspension assemblies is equalized with the longitudinal center line 132 of the equalizer bracket 42 in a substantially vertical position. As shown in the middle view, an increased loading on the front axle 14 causes the spring 64 to flatten somewhat thereby pivoting the equalizer bracket 42 in a clockwise direction about its pivotal mounting. The pivoting of the equalizer bracket in a clockwise direction changes the point of contact between the wear plate 90 on the equalizer bracket and the beam 62 moving the point of contact away from the fulcrum of the beam thereby increasing the effective length of the lever arm 134; while the length of lever arm 136 remains the same so that a greater force is transmitted through the beam to the air spring unit 58.

As shown in the right-hand view, a decreased loading on the front axle 14 causes the spring 64 to bow more thereby pivoting the equalizer bracket 42 in a counter-clockwise direction about its pivotal mounting. The pivoting of equalizer bracket in a counter-clockwise direction changes the point of contact between the wear plate 90 on the equalizer bracket and the beam 62 moving the point of contact toward the fulcrum of the beam thereby decreasing the effective length of the lever arm 134; while the length of lever arm 136 remains the same so that a lesser force is transmitted through the beam to the air spring unit 58.

FIG. 6 is a diagrammatic illustration to better illustrate the manner in which the point of contact between the convex surface of wear plate 90 and the substantially planar surface of beam 62 is altered. Arcs 140, 140' and tangential lines 150, 150' represent the convex surface of wear plate 90 and the planar surface of beam 62 in the two loading positions shown in the left-hand views of FIG. 5 with the unprimed arc and line representing the relative positions of the members illustrated in the left-hand view of FIG. 5 and the primed arc and line representing the position of the members illustrated in the middle view of FIG. 5. With the equalizer bracket in a substantially vertical position, the longitudinal center line 132 of the equalizer bracket passes through the points of contact 142 and 152 between the wear plate and the beam. With an increased loading on the front suspension assembly, the points of contact between the wear plate 90 and the beam 62 shift; the point of contact shifting to the right on the wear plate to point 144 and to the left on the beam to point 154. The distance L between the old point of contact 152 on the beam 62 and the new point of contact 154 on the beam 62 represents the increase in the effective length of lever arm 134 of the beam which thereby increases the amount of force transmitted through the beam to the air spring unit 58. Of course, with a decreased loading on the front suspension assembly, the wear plate would assume the position shown in the right-hand view of FIG. 5 with the point of contact on the wear plate 90 shifting to the left and the point of contact on the beam 62 shifting to the right. However, this position has not been diagrammatically represented in FIG. 6, since it is felt that the additional diagrammatic representation would unduly clutter this figure.

While the preferred form of the invention has been shown and described, it is to be understood that all suitable modifications and equivalents may be resorted to which fall within the scope of the invention as claimed.

What is claimed is:

1. An equalizer assembly for automatically distributing a load between axles of a tandem axle vehicle comprising:

an equalizer means, said equalizer means being pivotally carried by the frame of said vehicle and said equalizer means being pivotal about a substantially horizontal axis;

first suspension means associated with a first axle, said first suspension means being connected to said equalizer means with the point of connection between said first suspension means and said equalizer means being vertically spaced with respect to said horizontal axis of said equalizer means whereby movement of said first suspension means due to loading causes pivotal movement of said equalizer means;

second suspension means associated with a second axle of said vehicle, said second suspension means having a lever arm in contact with said equalizer means with the point of contact between said lever arm and said equalizer means being vertically spaced with respect to said horizontal axis of said equalizer means whereby said point of contact between said equalizer means and said lever arm is altered by pivotal movement of said equalizer means about said horizontal axis to thereby alter the effective length of said lever arm and the load distribution on said axles; and said horizontal axis of said equalizer means being intermediate said point of connection between said first suspension means and said equalizer means and said point of contact between said lever arm of said second suspension means and said equalizer means.

2. In the equalizer assembly of claim 1:
    said point of connection between said first suspension means and said equalizer means being above said horizontal axis, and
    said point of contact between said lever arm of said second suspension means and said equalizer means being below said horizontal axis.

3. In the equalizer assembly of claim 1:
    said first suspension means comprising of leaf spring;
    said second suspension means comprising an air spring suspension means.

4. In the equalizer assembly of claim 1:
    said first suspension means comprising a leaf spring, said leaf spring being mounted on said first axle and said leaf spring being pivotally connected at one end to said equalizer means.

5. In the equalizer assembly of claim 1:
    said second suspension means comprising an air spring means mounted on said vehicle frame and a beam, said beam being secured to said air spring means, and said beam being pivotally mounted on said second axle.

6. In the equalizer assembly of claim 5:
    said beam being pivotally mounted on said second axle intermediate its ends to form said lever arm which contacts said equalizer means and a second lever arm which is secured to said air spring means.

7. An equalizer assembly for automatically distributing a load between axles of a tandem axle vehicle comprising:

an equalizer means, said equalizer means being pivotally carried by the frame of said vehicle and said equalizer means being pivotal about a substantially horizontal axis;

first suspension means associated with a first axle, said first suspension means being connected to said equalizer means with the point of connection between said first suspension means and said equalizer means being vertically spaced with respect to said horizontal axis of said equalizer means whereby movement of said first suspension means due to loading causes pivotal movement of said equalizer means;

second suspension means associated with a second axle of said vehicle, said second suspension means having a lever arm in contact with said equalizer means with the point of contact between said lever arm and said equalizer means being vertically spaced with respect to said horizontal axis of said equalizer means whereby said point of contact between said equalizer means and said lever arm is altered by pivotal movement of said equalizer means about said horizontal axis to thereby alter the effective length of said lever arm and the load distribution on said axles; and said equalizer means comprising a pair of spaced-apart plates, said plates being interconnection and said plates having upper portions extending above said horizontal axis and lower portions extending below said horizontal axis; connector means for pivotally connecting said first suspension means to said equalizer means, said connector means being carried by said upper portions of said spaced-apart plates; and wear plate means for contacting said first lever arm, said wear plate means being carried by said lower portions of said spaced-apart plates.

8. In the equalizer assembly of claim 7:
    said connector means being a pin extending between and secured to said spaced-apart plates; and
    said wear plate means having a convex underside which contacts said lever arm.

9. An equalizer assembly for automatically distributing a load between axles of a tandem axle vehicle comprising:
    leaf spring suspension means having its medial portion fixedly secured to a first axle of said vehicle;
    air spring suspension means, said air spring suspension means comprising an air spring means mounted on the frame of said vehicle and a beam, said beam having first and second end portions, said beam being pivotally mounted on a second axle of said vehicle by pivotal mounting means located intermediate said end portions of said beam to form first and second lever arms, said first lever arm extending from said pivotal mounting means to said first end of said beam, said first lever arm contacting an equalizer bracket and said second lever arm extending from said pivotal mounting means to said second end of beam, said second lever arm being secured to said air spring means; and said equalizer bracket comprising a pair of spaced-apart plates carried by said frame, said plates being pivotal about a substantially horizontal axis, said plates being interconnected, said plates having upper portions extending above said horizontal axis and lower portions extending below said horizontal axis; connector means for pivotally connecting said leaf spring suspension means to said equalizer bracket, said connector means being carried by said upper portions of said spaced-apart plates; and wear plate means for contacting said first lever arm, said wear plate means being carried by said lower portions of said spaced-apart plates.

References Cited
UNITED STATES PATENTS 2,321,864   6/1943   Schoenrock.
3,096,995   7/1963   Richnow.

JAMES R. MARBERT, Primary Examiner

U.S. Cl. X.R.

280—124